United States Patent Office 3,326,518
Patented June 20, 1967

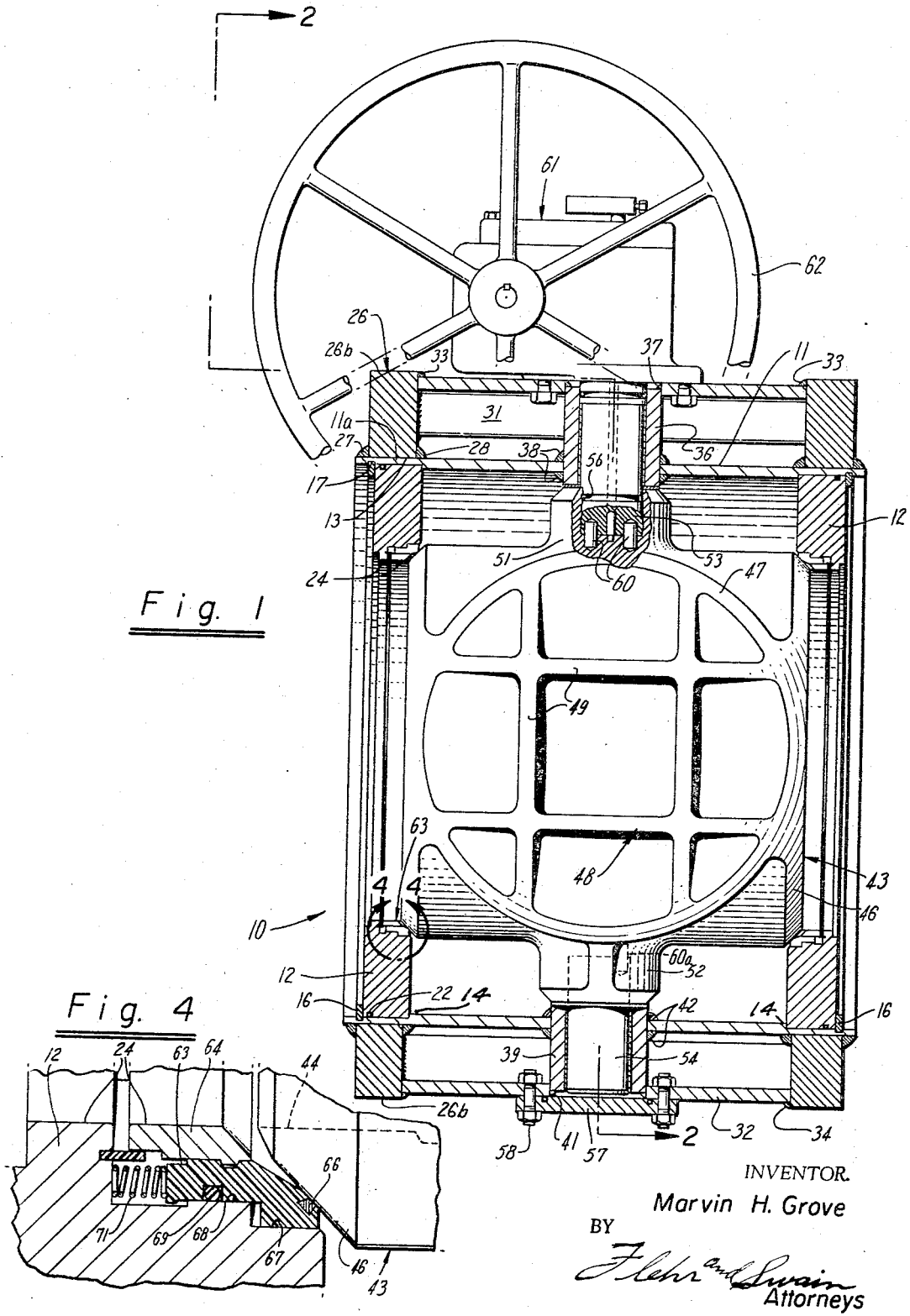

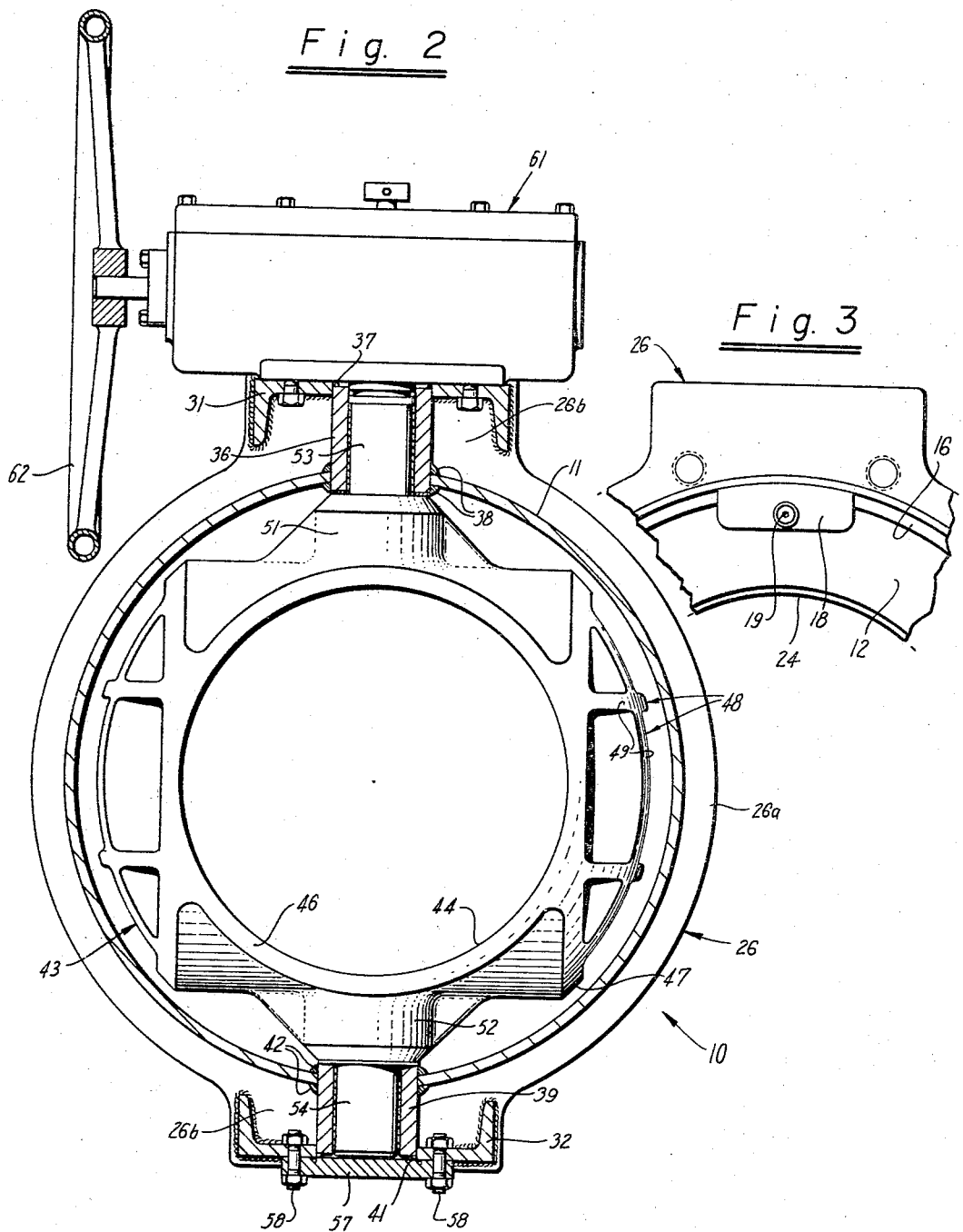

3,326,518
VALVE CONSTRUCTION
Marvin H. Grove, Piedmont, Calif., assignor to M & J Valve Company, Houston, Tex., a corporation of Delaware
Filed May 27, 1964, Ser. No. 370,418
1 Claim. (Cl. 251—309)

This application is a continuation-in-part of my application Ser. No. 190,573, filed Apr. 30, 1962, for "Valve Construction" (now abandoned).

This invention relates generally to valves such as are employed for controlling fluid flow, including both liquid and gases.

In recent years a number of valves have been commercialized which employ bodies of fabricated construction. The body may consist of portions bolted together, or structural parts, such as plates, angles, channels and the like, secured together by welding. Where the main part of the body is box-like in form, as with gate valves, fabrication has been successful and such valves have been relatively economical to manufacture, particularly in the larger sizes. However, with respect to valves of the type having rotating valve members, as for example ball valves, fabrication has met with certain difficulties, and manufacturing economies have not been experienced to the same degree.

In general, an object of the present invention is to provide a fabricated valve construction which is applicable for the economical manufacture of valves of the type having rotatable valve members.

Another object of the invention is to provide a valve of the above character which can be made in relatively large sizes and suitable for high pressure service.

Additional objects and features of the invention will appear from the following description in which the preferred embodiment has been set forth in detail in conjunction with the accompanying drawing.

Referring to the drawing:

FIGURE 1 is a side elevational view in section illustrating a valve of the ball type incorporating the invention;

FIGURE 2 is a cross-sectional view taken along the line 2—2 of FIGURE 1;

FIGURE 3 is a detail illustrating the manner in which locking segments are removably retained; and FIGURE 4 is a detail in section illustrating one form of sealing means which can be employed.

The valve illustrated in the drawing consists of a body 10 which is formed of a main section 11, and the end walls 12. The main section 11 is cylindrical and can be made of a suitable steel or steel alloy. It can be formed as a forging, or by cutting off a section of a pipe of suitable strength and dimensions. The end walls 12 can be made from flat steel plate with a wall thickness sufficient to withstand the pressures involved. In actual manufacture these walls can be cut from mill rolled plate by torch cutting, after which the outer periphery can be finished by machining or grinding. Each end portion 11a of the main section 11 is machined to provide a bore 13 within which the end wall 12 is fitted. Normally the inner faces of the end walls seat upon the annular shoulders 14.

Instead of employing weld connections to retain the end walls 12 in assembled relation with respect to the body section 11, I prefer to use means in the form of locking segments 16. These segments can be formed of hardened steel or steel alloy, and they are fitted within a circular groove 17 which is machined in the inner periphery of each end portion 11a. The segments when assembled within the groove 17 form a continuous abutment shoulder engaging the margin of the adjacent end wall 12.

Suitable means are provided for removably retaining the locking segments 16 within each groove 17. As indicated in FIGURE 3, each locking segment 16 can be engaged by a retaining plate 18, which is held in place by the screw 19.

Suitable means are provided for forming fluid-tight seals between the peripheries of the end walls 12 and the main body section. For this purpose I have shown sealing means 22 of the resilient O-ring type.

The end walls 12 are shown provided with aligned openings 24 forming valve flow passages and which are adapted to make connection with associated piping. Associated piping may be directly connected, as by welding, to the end walls 12, or if desired, the end walls can be provided with short pipe sections or hubs.

The main section 11 is provided with exterior reinforcing means. Thus each end portion 11a is surrounded by a generally annular member 26, the configuration of which can be generally as shown in FIGURE 2. Weld connections 27 and 28 serve to securely attach the members 26 to the main section 11, whereby each member 26 generally embraces the portion 11a and the bore 13.

Assuming that the configuration of each member 26 is substantially as shown in FIGURE 2, diametrically opposite extensions 26b are provided which are connected by the arcuate rib-like portions 26a.

It will be evident that the rigid members 26, when welded as described about the end portions 11a of the body section 11, serve to reinforce the end portions of the body against internal pressure and also against stresses that may be applied to the end portions from the piping connected to the same. In addition, sufficient metal is provided whereby the structure is not weakened by machining the grooves 17.

The extensions 26b serve to carry means for mounting bearing members. Thus structural members 31 and 32 are located at the top and bottom sides of the body, and are secured to the corresponding portions 26b by weld connections 33 and 34. The structural members 31 and 32 can be mill rolled channels as shown in FIGURE 2.

At the top of the valve the web of the channel 31 and the underlying portion of the body section 11 are provided with aligned openings to accommodate the bearing sleeve 36. This sleeve is welded in place as by the weld connections 37 and 38. A similar sleeve 39 is provided on the lower side of the valve, and this is likewise welded in place by the weld connections 41 and 42.

Within the valve body there is a rotatable valve member 43 which generally is in the form of a ball. The ball is formed to provide the port 44 which registers with the flow passages 24 for full open position. The annular portion of the valve ball surrounding the ends of the port 44 are machined to form the generally spherically shaped valve working surface 46. Ninety degrees displaced from the valve working surfaces 46, the opposite sides of the ball are provided with generally spherically shaped valve working surfaces 47 which at their edges merge with the valve working surfaces 46. Cross ribbing 48 within the valve working surfaces 47 is likewise provided with machined faces 49 which conform to the generally spherical configuration. The walls within the valve working surfaces 47 are closed and thus provide closures when the ball is turned 90° from the position shown in FIGURE 1.

The upper and lower ends of the ball 43 are shown provided with shaft mounting studs 51 and 52, which are provided with aligned bores to accommodate the stud shafts 53 and 54. Stud shaft 53 is sealed with respect to the stud 51, as by means of a seal 56 of the resilient O-ring type. At the lower end of the valve a closure plate 57 is provided which is secured to the channel 32 as by bolts 58. Stud shaft 53 is coupled to the ball as by means of the dowel pins 60. A similar dowel pin 60a can be provided for stud shaft 54.

The channel 31 provides convenient means for mounting a valve operator 61. This operator can be any one of various types, including both manual and power operated devices. As illustrated, the operator may consist of a housing 61 having internal motion applying means (not shown) coupled to the stud shaft 53, and which is operated by the hand wheel 62.

The sealing means for forming seals between the ball and the body may vary in accordance with requirements. The particular seal means illustrated in FIGURE 4 is similar in some respects to the seal illustrated in my Patent No. 3,121,553. It consists of an annular member or seal ring 63 made of suitable material like nylon, which is attached to the outer periphery of the metal carrier ring 64. That part of the member 63 which contacts the valve working surface 46 can be provided with a resilient insert 66. The seal ring 63 is slidably retained within the body bores 67 and 68. Also the ring is sealed with respect to the body as by means of the O-ring 69. Compression springs 71 serve to urge the member 63 toward the valve working surface 46.

It will be evident that the valve described above has certain distinguishing characteristics. The body of the valve is relatively simple to manufacture, and is made entirely by fabrication. The main cylindrical section 11 forms a cylindrical pressure vessel for withstanding relatively high pressures. The end portions 11a, which receive stresses from the members 12, are adequately reinforced by the welded-on members 26. Also because of such reinforcement they are not weakened by the grooves 17. The journals for the stud shafts 53 and 54 are attached to the fabricated body in such a manner as not to weaken the pressure vessel formed by cylindrical section 11, and at the same time they are held rigidly by the structural members 31 and 32. These members in turn are rigidly carried by the members 26.

As with conventional ball valves, the valve is moved between full open and closed positions by turning the valve member through 90°. During the course of this movement substantial portions of the nylon seal ring 63 remain in contact with the valve working surfaces 46 and 47, and also with the surfaces 49 of the ribbing.

The pressure area presented to fluid pressure by each seal ring 63 is determined by the difference between the diameter of bore 68 and the resilient insert 66. Assuming that these diameters are substantially the same, then fluid pressure differential applied to the seal ring 63 does not tend to urge it either against or away from the valve working surface 46. In such event the compression spring 68 serves as means for urging the seal ring against the ball.

In other instances the proportions may be such that a fluid pressure area is presented to upstream pressure differential, thereby urging the seal ring against the ball.

The component parts of the body can be readily prepared from mill steel stock and can be readily assembled by known methods of fabrication. As previously stated, the cylindrical section 11 forms a cylindrical pressure vessel adequate to withstand the internal pressures to which it is subjected. The end portions of this section are adequately reinforced whereby they can be machined without weakening and whereby sufficient rigidity and strength are provided to withstand stresses which may be applied from associated piping. The mounting means for the bearing members 36 and 39 provides accurate rigidity and strength, and the top channel member 31 in addition provides a mounting for the valve operator 61. The members 12 and 26, because of the dimensions of their peripheries which engage the cylindrical portions 11a, may be torch-cut from a single steel plate.

I claim:

In a valve construction of the type having a valve member rotatable about its axis and disposed within a valve body, a valve body comprising a cylindrical shaped main section forming a pressure vessel, means surrounding and welded to the end portions of said main section and extending to form exterior reinforcing ribs, annular members disposed within the end portions of the main section and secured thereto, said members having aligned openings forming flow passages, aligned bearing sleeves welded to diametrically opposite portions of the main section intermediate its ends, structural members connecting said exterior ribs to said bearing sleeves, a rotatable valve member disposed within the body, and means within said sleeves for journalling the valve member for rotation about an axis at right angles to the axis of the cylindrical shaped main section.

References Cited

UNITED STATES PATENTS

| | | | |
|---|---|---|---|
| 2,628,809 | 2/1953 | Mikeska | 251—317 |
| 3,000,608 | 9/1961 | Williams | 251—367 X |
| 3,009,680 | 11/1961 | Kaiser | 251—367 X |

FOREIGN PATENTS

| | | |
|---|---|---|
| 1,319,934 | 1/1963 | France. |
| 891,372 | 3/1962 | Great Britain. |
| 567,548 | 10/1957 | Italy. |

M. CARY NELSON, *Primary Examiner.*

HENRY T. KLINKSIEK, *Examiner.*